United States Patent
Vignon et al.

(10) Patent No.: US 7,406,546 B1
(45) Date of Patent: Jul. 29, 2008

(54) LONG-DISTANCE SYNCHRONOUS BUS

(75) Inventors: Blaise A. Vignon, Stanford, CA (US);
Sean J. Treichler, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 338 days.

(21) Appl. No.: 11/206,329

(22) Filed: Aug. 17, 2005

(51) Int. Cl.
*G06F 13/00* (2006.01)

(52) U.S. Cl. .............................. 710/33; 710/34; 710/36; 710/52; 710/56; 710/58

(58) Field of Classification Search .................... 710/33
See application file for complete search history.

(56) References Cited

U.S. PATENT DOCUMENTS

2006/0075161 A1* 4/2006 Grijalva et al. ............... 710/52
2006/0221948 A1* 10/2006 Benner et al. ............... 370/389

* cited by examiner

*Primary Examiner*—Niketa I Patel
(74) *Attorney, Agent, or Firm*—Patterson & Sheridan LLP (57) ABSTRACT

One embodiment of a long-distance synchronous bus includes a sending unit and a receiving unit. The sending unit and receiving unit are configured to use credit-based handshaking signals to regulate data flow between themselves. The receiving unit includes a skid buffer for storing data packets received from the sending unit. The sending unit transmits one data packet to the receiving unit for each credit in possession and consumes one credit for each such transmitted data packet. The receiving unit transmits one credit to the sending unit for each data packet that is read out of the skid buffer. In another embodiment, transmitted data may be broadcast to multiple receiving units by routing the data from the sending unit to the multiple receiving units and maintaining separate credit-based handshaking signals for each receiving unit.

20 Claims, 9 Drawing Sheets

LONG-DISTANCE SYNCHRONOUS BUS

BACKGROUND OF THE INVENTION

1. Field of the Invention

Embodiments of the present invention relate generally to integrated circuit design and more specifically to a long-distance synchronous bus.

2. Description of the Related Art

Complex integrated circuit designs are typically comprised of a plurality of logic blocks. As is often the case, a first logic block transmits data to a second logic block. There are several established methods of data flow control that are used in cases when the second logic block cannot always accept the data from the first logic block. One such method uses a valid and a busy signal. The valid signal is transmitted with the data and, when asserted, indicates to the second block that the data arriving at the second block is valid (i.e., should be accepted). The busy signal is asserted by the second logic block to indicate to the first logic block the second logic block cannot currently accept data. The first logic block responds by not transmitting any additional data until the busy signal is de-asserted.

For this method of flow control to work properly, there cannot be any excessive latency in the timing of the busy and valid signals. For example, assuming a synchronous system, the busy signal must be received by the first logic block within the same clock cycle as the data being currently being transmitted. If the busy signal is not received within the same clock cycle, then the data may be lost since the first logic block ends up sending the data when the second logic block is not accepting data. The timing requirements of the valid and busy signals limit the distance that the first logic block may transmit data to the second logic block to approximately the distance that a signal propagates during one-half a clock cycle.

In view of flow control signal timing requirements, one or more retiming stages may be used between logic blocks to increase the distance data can be transmitted. Generally, a retiming stage receives a data packet and a corresponding valid signal from a first logic block and then transmits both to a second logic block so long as the second logic block has not sent a busy signal to the first logic block. In a synchronous system, the signals and data packet are typically received by flops clocked by a clock signal. Since the valid and busy signals are timing critical signals, the retiming stage includes additional logic to decouple the valid and busy signals from the first logic block and the second logic block. The decoupling allows a busy signal sent from the second logic block to be detected so that a data packet transmitted by the first logic block can be held until the busy signal has cleared.

One drawback to this approach is that the additional logic adds propagation delays to the valid and busy signals. As is well-known, the distance that a signal travels between a first logic block and a second logic block during a clock cycle may be determined using a timing budget, where the sum of the propagation delays of the signal through system elements, such as logic components, and the propagation delay of the signal in the wire(s) between the first and second logic blocks is equal to the clock period. When a retiming stage disposed between the first and second logic blocks includes additional logic, the propagation delays through the additional logic reduce the amount of time left in the clock cycle for the signal to propagate through the wire(s) between the first and second logic blocks. Thus, the signal does is unable to travel as far during each clock cycle. Since the distance traveled is reduced, more retiming stages may be required between the first logic block and the second logic block, leading to increased design complexity and retiming stage area requirements.

Another drawback is that a logic designer may try to anticipate timing problems caused by long data paths between logic blocks by inserting retiming stages into the initial hardware design. However, if a retiming stage is not needed in the final design, then the overall design is burdened with excess logic, which unnecessarily consumes die area.

These drawbacks are exacerbated in cases where a sending logic block transmits data to more than one receiving logic block.

As the foregoing illustrates, what is needed in the art is a more flexible bus design that implements simpler retiming stages.

SUMMARY OF THE INVENTION

One embodiment of the present invention is system for transmitting data over a bus. The system comprises a sending unit that includes a sender controller, and a receiving unit that includes a receiver controller. The sender controller is configured to receive a credit transmitted by the receiver controller and, in response to receiving the credit, the sending unit is configured to transmit a data packet to the receiving unit.

One advantage of the disclosed system is that the sending unit is configured to transmit a data packet to the receiving unit only when the sender controller receives a credit from the receiving unit. Each credit indicates that a skid buffer included in the receiving unit has space available for an additional data packet, so the sending unit never transmits a data packet when the receiving unit does not have the capacity to handle an additional data packet. Thus, with the configuration of the present invention, the skid buffer does not overflow. Unlike the prior art approach, the architecture of the present invention does not rely on busy signals to indicate that the receiving unit is unable to accept additional data packets. Consequently, simpler retiming stages may reside in between the sending unit and the receiving unit since the retiming stages do not have to include logic for detecting busy signals transmitted by the receiving unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
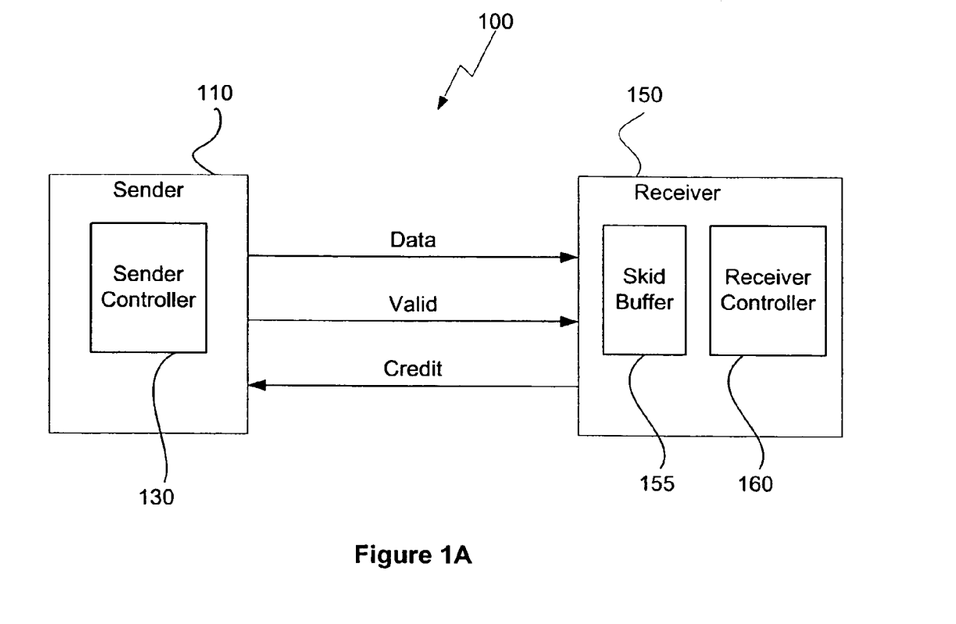
FIG. 1A is a conceptual diagram of a long-distance synchronous bus, according to one embodiment of the invention.

FIG. 1A is a conceptual diagram of a long-distance synchronous bus 100, according to one embodiment of the invention. As shown, the long-distance synchronous bus 100 includes, without limitation, a sending unit 110 and a receiving unit 150. The sending unit 110 includes a sender controller 130 and is configured to transmit data packets to the receiving unit 150 only when the sender controller 130 has an inventory of credits. A credit indicates to the sender controller 130 that the receiving unit 150 has the capacity to accept an additional data packet. The sender controller 130 "consumes" a credit for each data packet transmitted to the receiving unit 150. Thus, the sender controller 130 is configured to track the credits received from the receiving unit 150 and consumed when data packets are transmitted to the receiving unit 150. In addition, for each transmitted data packet, the sender controller 130 is configured to send a corresponding valid signal to the receiving unit 150. As used herein, a "data packet" may be any fixed amount of data such as a bit, byte, word or the like.

The receiving unit 150 includes a skid buffer 155 and a receiver controller 160. When a valid signal transmitted by the sender controller 130 is asserted, the receiving unit 150 receives the data packet corresponding to that valid signal and stores it temporarily in the skid buffer 155. The receiver controller 160 monitors the skid buffer 155 and releases one credit through the credit for each data packet that is read out of the skid buffer 155. The released credit is transmitted to the sending unit 110 and indicates that there is room in the skid buffer 155 to accommodate an additional data packet.

Figure 1B:
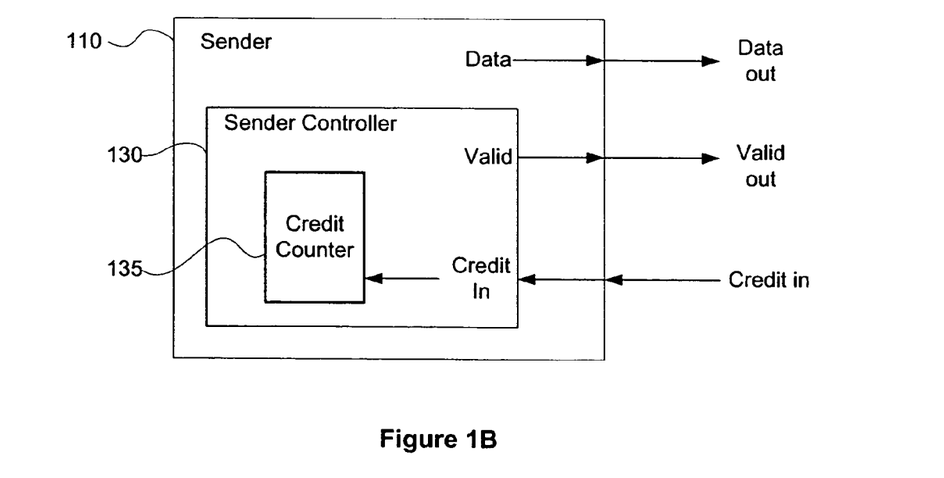
FIG. 1B is a conceptual diagram of the sending unit of FIG. 1A, according on one embodiment of the invention.

FIG. 1B is a conceptual diagram of the sending unit 110 of FIG. 1A, according on one embodiment of the invention. As previously described, the sender controller 130 controls the transmission of data packets to the receiving unit 150. The sender controller 130 includes, without limitation, a credit counter 135 that is configured to track credits. The credit counter 135 is incremented for each credit received from the receiving unit 150 and is decremented for each data packet transmitted to the receiving unit 150. As previously explained herein, each credit indicates that the skid buffer 155 has memory space available for one additional data packet. Therefore, the sender controller 130 is configured not to transmit data packets to the receiving unit 150 unless the credit counter 135 is greater than zero.

Figure 1C:
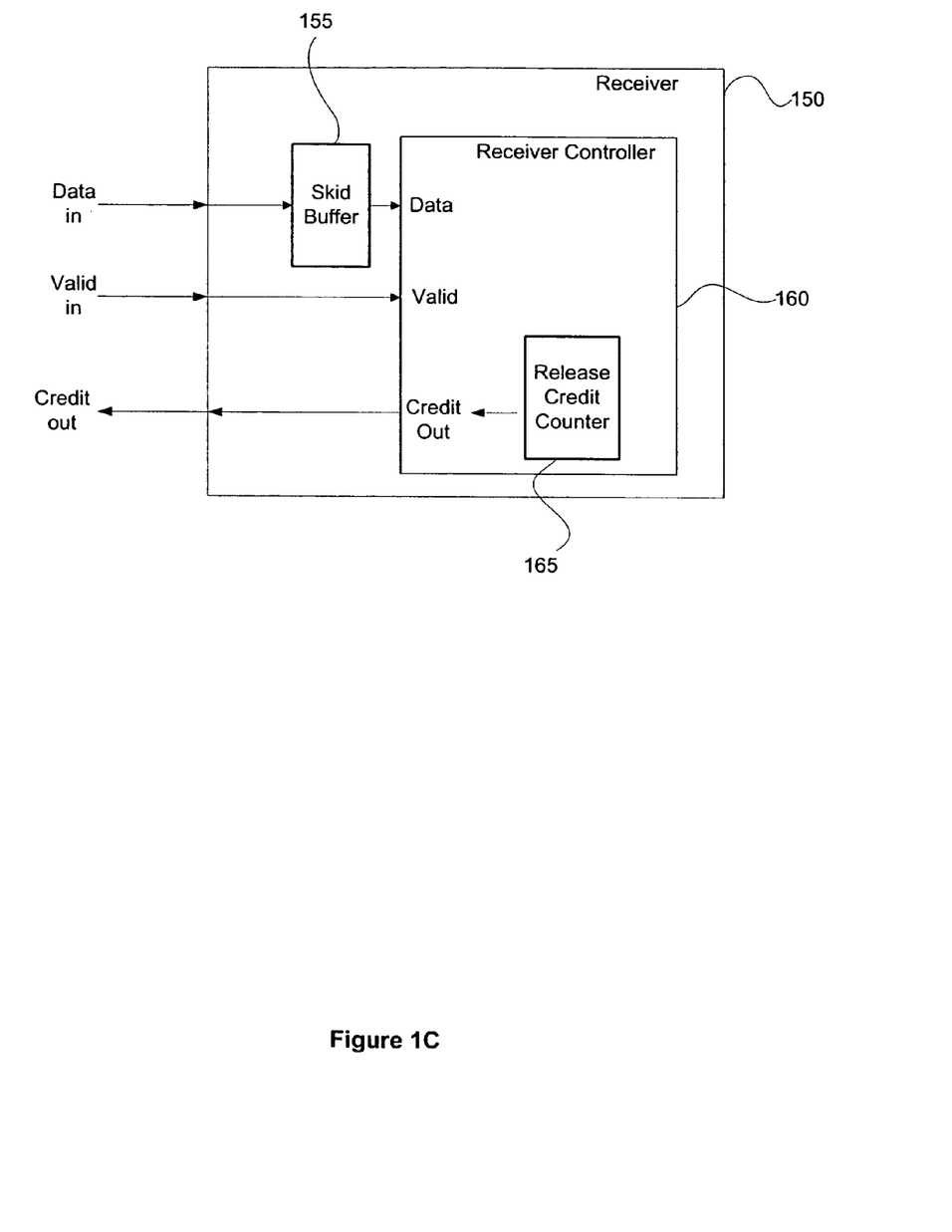
FIG. 1C is a conceptual diagram of the receiving unit of FIG. 1A, according to one embodiment of the invention.

FIG. 1C is a conceptual diagram of the receiving unit 150 of FIG. 1A, according to one embodiment of the invention. The receiving unit 150 includes, without limitation, a receiver controller 160 and the skid buffer 155. As previously described, the skid buffer 155 is configured to temporarily store data packets that are received from the sending unit 110. The receiver controller 160 includes a release credit counter 165 that is configured to track the number of credits yet to be released to the sending unit 110. The release credit counter 165 is incremented for each data packet read out of the skid buffer 155 and is decremented for each credit transmitted to the sending unit 110. As described in further detail herein, the receiver controller 160 is configured to transmit credits to the sending unit 110 until the release credit counter 165 equals zero.

As persons skilled in the art will recognize, since the sending unit 110 is configured to transmit a data packet to the receiving unit 150 only when the credit counter 135 indicates that there is an available credit (i.e., the count is greater than zero) and each credit indicates that the skid buffer 155 has space available for an additional data packet, the skid buffer 155 never overflows. Further, the sending unit 110 never transmits a data packet when the receiving unit 150 does not have the capacity to handle an additional data packet. Thus, unlike the prior art approach, the architecture of the present invention does not rely on busy signals to indicate that the receiving unit 150 is unable to accept additional data packets. As described in further detail herein, one advantage of the present invention is that the retiming stages between a sending unit and a receiving unit can be simplified since they do not need to include the additional logic required to detect a transmitted busy signal as required of the prior art retiming stages.

Figure 2:
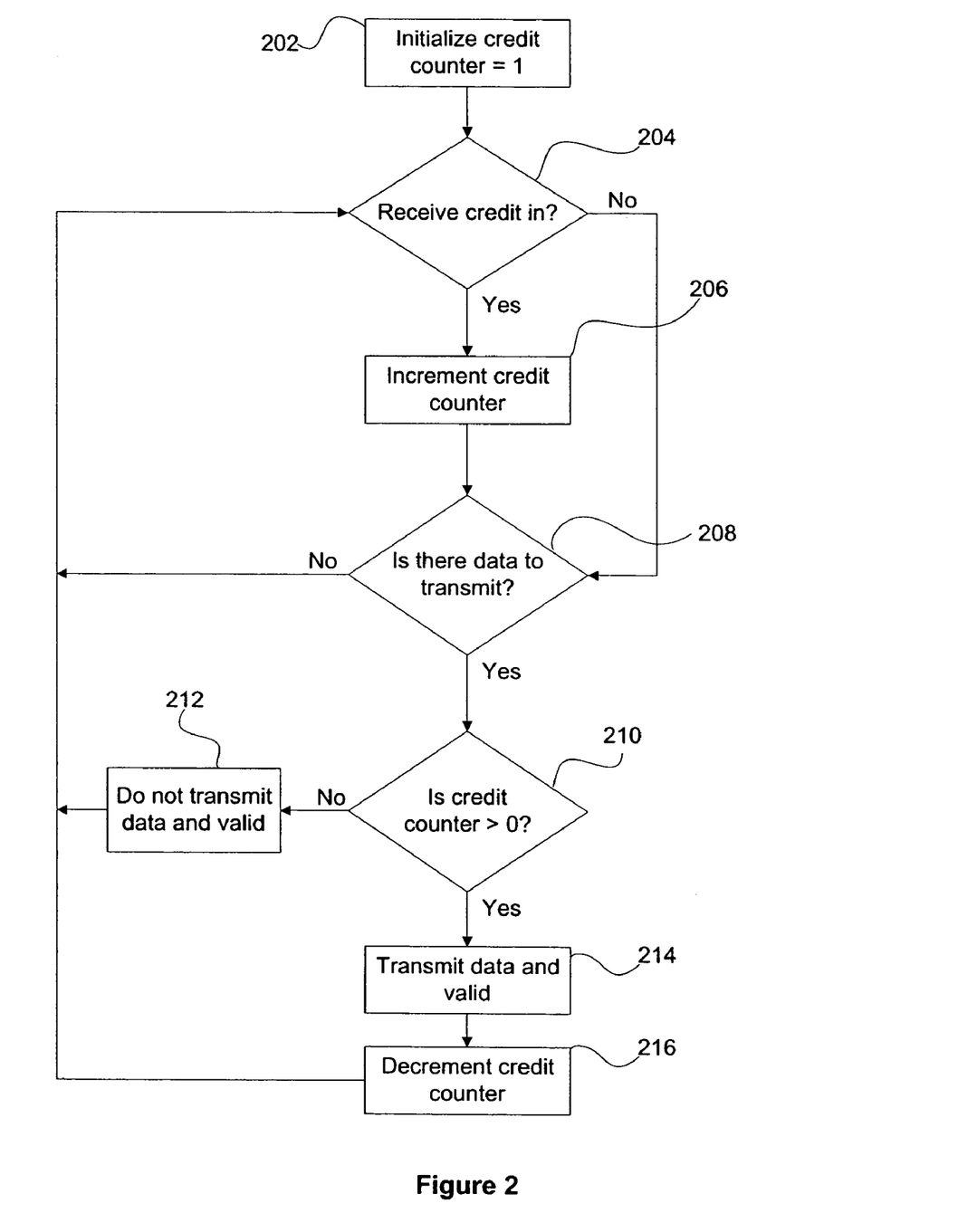
FIG. 2 is a flowchart of method steps for controlling data transmissions from the sending unit, according to one embodiment of the invention.

FIG. 2 is a flowchart of method steps for controlling data transmissions from the sending unit 110, according to one embodiment of the invention. Persons skilled in the art will recognize that any system configured to perform the method steps in any order is within the scope of the invention.

The method begins in step 202, where the credit counter 135 is initialized to one. Since the credit counter 135 is initialized to one, the sending unit 110 is able to transmit one data packet to the receiving unit 150 when the data is available for transmission. In step 204, the sender controller 130 determines if a credit has been received from the receiving unit 150. If a credit has not been received, then the method proceeds to step 208. If, however, a credit has been received, then in step 206, the credit counter 135 is incremented. Again, the credit counter 135 tracks the inventory of credits available to the sender controller 130.

In step 208, the sender controller 130 determines if there is a data packet available to transmit. If there is no data packet available, then the method returns to step 204. If, on the other hand, there is a data packet available, then in step 210, the sender controller 130 determines if the credit counter 135 is greater than zero. If the credit counter 135 is not greater than zero, the sending unit 110 has no credits available, indicating that the receiving unit 150 is currently unable to accept an additional data packet. Therefore, in step 212, the data packet and its corresponding valid signal are not transmitted. If, however, the credit counter 135 is greater than zero, then in step 214, the sending unit 110 and the sender controller 130 transmit the data packet and the corresponding valid signal to the receiving unit 150. In step 216, the credit counter is decremented since a data packet was transmitted. The method then returns to step 204.

The method of FIG. 2 advantageously configures the sending unit 110 such that data packets are only transmitted when the sender controller 130 is certain that the data can be stored in the skid buffer 155 of the receiving unit 150. The credit counter 135 enables the sender controller 130 to track the available space within the skid buffer 155.

Figure 3:
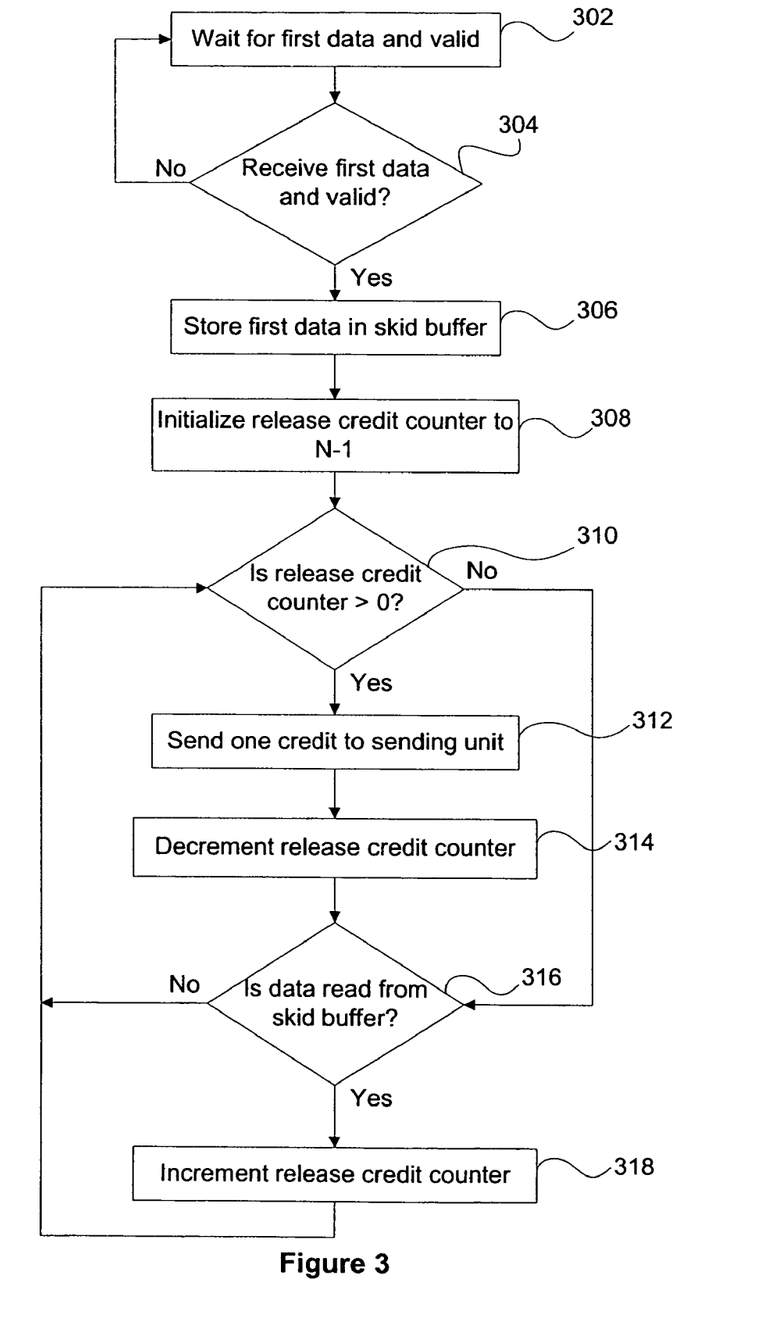
FIG. 3 is a flowchart of method steps for controlling credit transmissions from the receiving unit, according to one embodiment of the invention.

FIG. 3 is a flowchart of method steps for controlling credit transmissions from the receiving unit 150, according to one embodiment of the invention. Persons skilled in the art will recognize that any system configured to perform the method steps in any order is within the scope of the invention.

The method begins with step 302, where the receiver controller 160 waits for a first data packet and corresponding valid signal to be transmitted by the sending unit 110. In step 304, if the receiver controller 160 does not receive the first data packet and valid signal, then the method returns to step 302. If, however, the receiver controller 160 receives the first data packet and valid signal, then in step 306, the first data packet is stored in the skid buffer 155. Next, in step 308, the release credit counter 165 is initialized to a count of N−1, where N is the maximum number of data packets that the skid buffer 155 is configured to store. For example, if the skid buffer can accommodate four data packets, then N would equal four. As set forth below, the initialization of the release credit counter 165 enables the receiving unit 150 to transmit N−1 credits to the sending unit 110, which would indicate to the sending unit 110 that there is N−1 packets worth of space available in the skid buffer 155.

In step 310, the receiver controller 160 determines if the release credit counter 165 is greater than zero. If the release credit counter 165 is not greater than zero, then no credits are released and transmitted to the sending unit 110, and the method proceeds to step 316. If, however, the release credit counter 165 is greater than zero, then there are one or more credits that may be released and transmitted to the sending unit 110, and the method proceeds to step 312. In step 312, a credit is released to the sending unit 110. In step 314, the release credit counter 165 is decremented, and the method proceeds to step 316.

In step 316, the receiver controller 160 determines if a data packet has been read out of the skid buffer 155. A data packet may be read out of the skid buffer 155 by a processor, a hardware unit such as a logic block, or the like. If a data packet has not been read out of the skid buffer 155, then the method returns to step 310. If, on the other hand, a data packet has been read out of the skid buffer 155, then the skid buffer 155 has memory space available for an additional data packet. Therefore, in step 318, the receiver controller 160 increments the release credit counter 165. The method then returns to step 310.

As persons skilled in the art will recognize, beginning with step 310, the operation of the release credit counter 165 is decoupled from the storing of data packets in the skid buffer 155. The release credit counter 165 is incremented only when a data packet is read out of the skid buffer 155 and decremented only when a credit is released to the sending unit 110. As previously explained herein, the manner in which credits are released and transmitted to the sending unit 110 prevents the skid buffer 155 from overflowing.

Because to the initialization steps of 302, 304, 306 and 308, the sending unit 110 may be designed without any knowledge of the size of the skid buffer 155 in the receiving unit 150. As soon as the receiving unit 150 receives the first data packet from the sending unit 110, the receiver controller 160 sets the release credit counter 165 to N−1. The N−1 credits released from the receiving unit 150, in addition to the credit used to initialize the credit counter 135, equals the total number of data packets, N, that may be stored in the skid buffer 155 at any given time. Hence, the same sending unit design may be used with different types receiving units having skid buffers of varying sizes.

Another advantage of the present invention is that, without retiming stages, the sending unit 110 is able to transmit data packets greater distances relative to the prior art design. Unlike the valid and busy signals of the prior art design, the valid and credit signals are not required to be generated and sent within the same clock cycle since the sending unit 110 never transmits a data packet unless there is an inventory of credits in the credit counter 135. Consequently, without retiming stages, the valid signal has a full clock cycle to propagate to the receiving unit 150, and, likewise, the credit has a full clock cycle to propagate to the sending unit 110. Thus, the sending unit 110 and the receiving unit 150 may be spaced farther apart relative to prior art designs.

Figure 4:
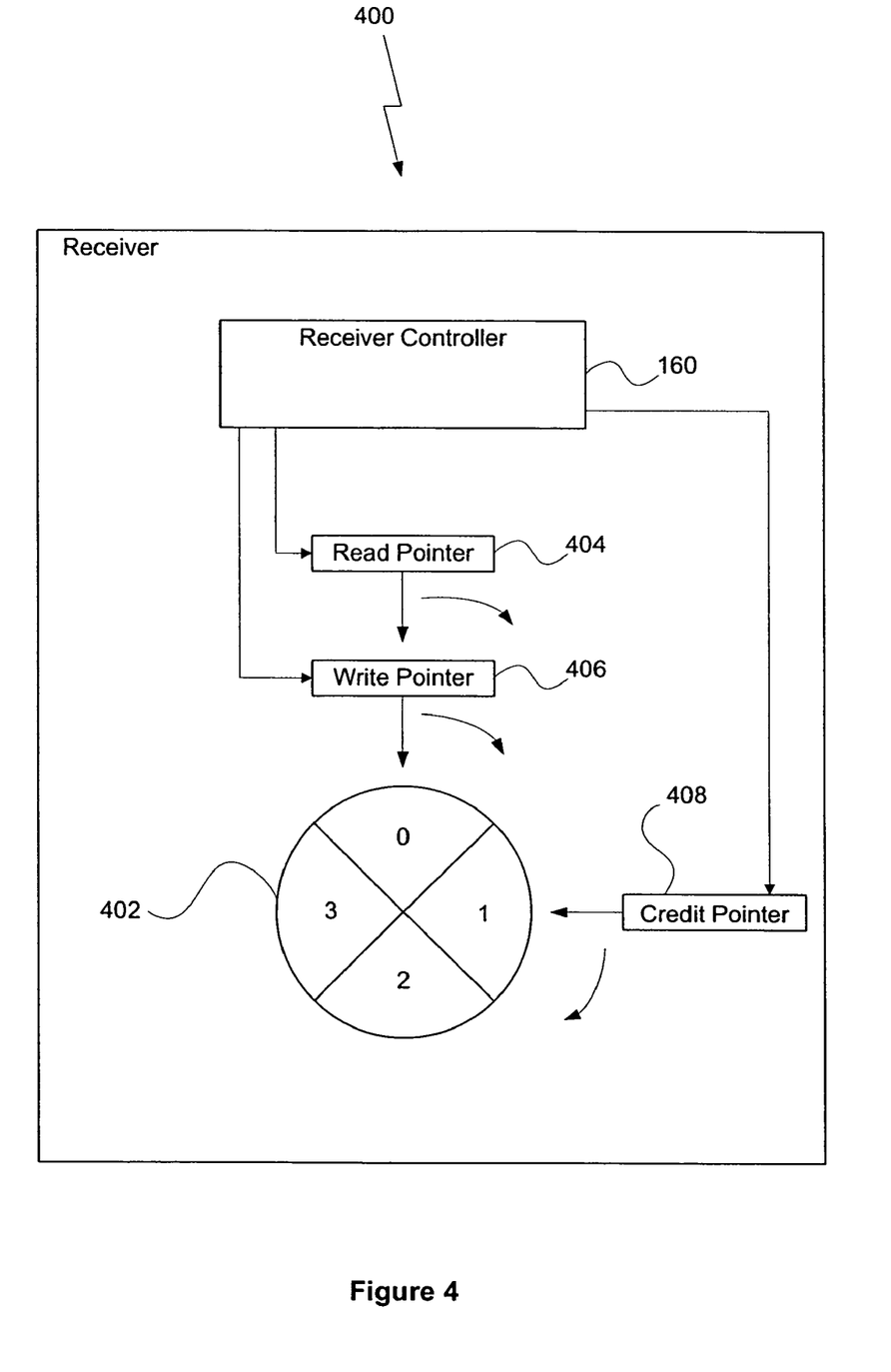
FIG. 4 is a conceptual diagram of the receiving unit of FIG. 1A, according to an alternative embodiment of the invention.

FIG. 4 is a conceptual diagram of the receiver 400 of FIG. 1A, according to an alternative embodiment of the invention. The receiver 400 includes, without limitation, the receiver controller 160, a skid buffer 402, a read pointer 404, a write pointer 406 and a credit pointer 408. In this embodiment, the skid buffer 402 includes four locations where data packets may be stored. Other embodiments may include more or less than four such locations. The receiver controller 160 accesses the contents of the skid buffer 402 using the read pointer 404 and the write pointer 406. Data is read from the skid buffer 402 by reading from the location indicated by the read pointer 404. Similarly, data is stored in the skid buffer 402 by writing to the location indicated by the write pointer 406. After data is written to or read from the skid buffer 402, the associated pointer is advanced to the next skid buffer location. For example, after data is read from the skid buffer location indicated by the read pointer 404, the read pointer 404 is advanced to the next location of the skid buffer 402, as illustrated by the arrows in FIG. 4. Likewise, after data is written to the skid buffer location indicated by the write pointer 406, the write pointer 406 is advanced to the next location of the skid buffer 402, as also illustrated by the arrows in FIG. 4.

The credit pointer 408 is used to determine if credits should be released and transmitted to the sending unit 110. If the credit pointer 408 is not pointing to the same location as the read pointer 404, then a credit is released and the credit pointer 408 advanced to the next skid buffer location. This process is described in greater detail in FIG. 5.

Figure 5:
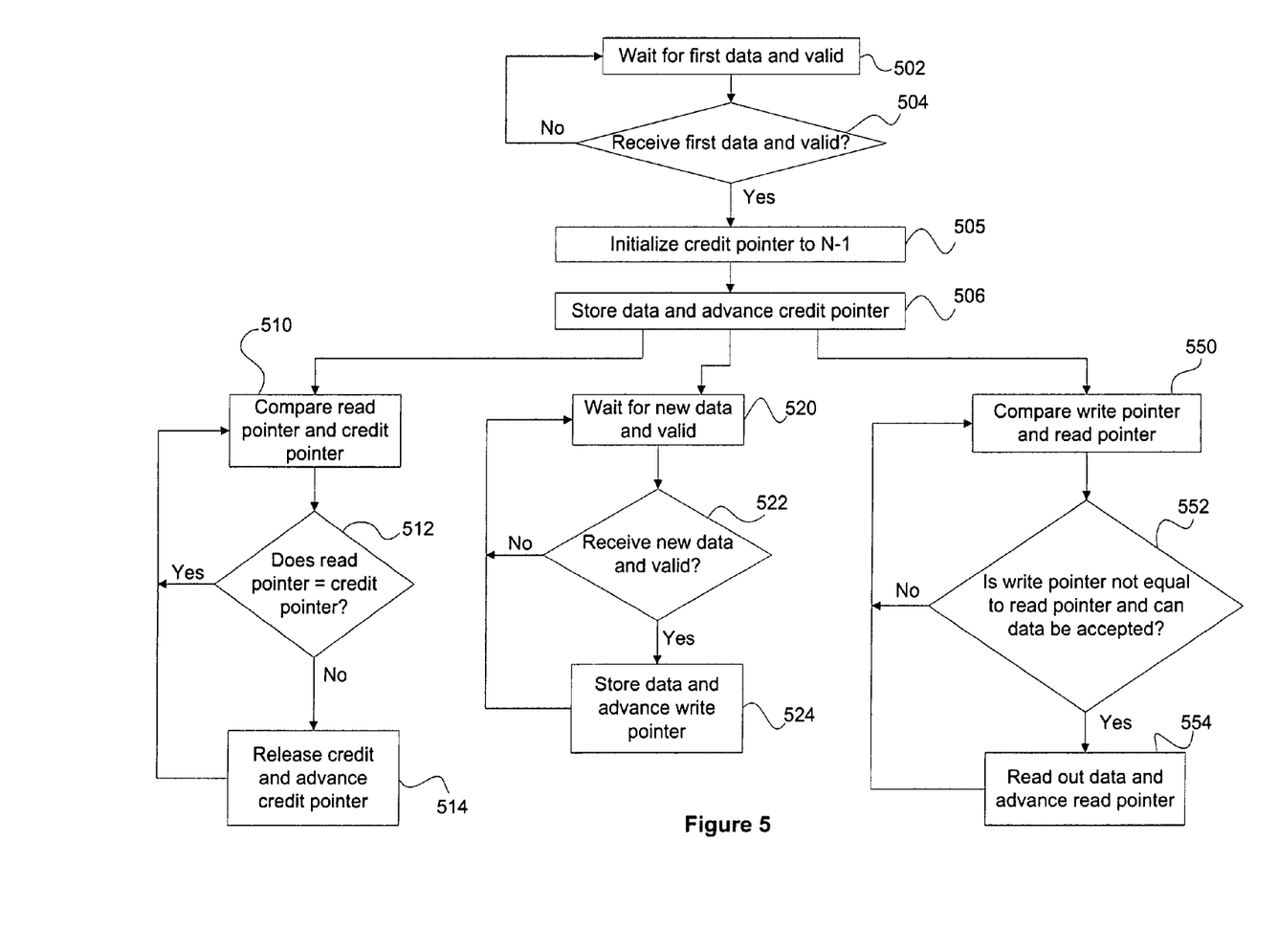
FIG. 5 is a flowchart of method steps for controlling credit transmissions from the receiving unit of FIG. 4, according to an alternative embodiment of the invention.

FIG. 5 is a flowchart of method steps for controlling credit transmissions from the receiving unit of FIG. 4, according to an alternative embodiment of the invention. Persons skilled in the art will recognize that any system configured to perform the method steps in any order is within the scope of the invention.

The method begins in step 502, where the receiver controller 160 waits for the first data packet and the corresponding valid signal to be transmitted by the sending unit 110. If, in step 504, the receiver controller 160 does not receive the first data packet and valid signal, then the method returns to step 502. If, however, the receiver controller 160 receives the first data packet and the corresponding valid signal, then in step 505, the credit pointer 408 is initialized to point to a location corresponding to the N−1 location, where N is the maximum number of data packets that can be stored in the skid buffer 155. In this example, the skid buffer 402 has four locations where data packets transmitted by the sending unit 110 may be stored. After the first data packet and valid signal are received, the receiver controller 160 initializes the credit pointer 408 to point to the N−1 location, which is location "1" in the example of FIG. 4. In step 506, the received data packet is written to the skid buffer 402, and the write pointer 406 is advanced to the next skid buffer location.

As shown in FIG. 5, after step 506, three processes run concurrently. The first concurrent process controls the release and transmission of credits to the sending unit 110. This process begins in step 510, where the receiver controller 160 compares the read pointer 404 to the credit pointer 408. In step 512, if the read pointer 404 and the credit pointer 408 are the same (i.e., they point to the same skid buffer location), then the first concurrent process returns to step 510. If, on the other hand, the read pointer 404 is not the same as the credit pointer 408 (i.e., they point to different skid buffer locations), then credits may be released and transmitted to the sending unit 110. In step 514, a credit is released to the sending unit 110, and the credit pointer 408 is advanced to the next skid buffer location. The first concurrent process then returns to step 510. In this fashion, credits are released and the credit pointer 408 is advanced, until the credit pointer 408 and the read pointer 404 point to the same skid buffer location.

The second concurrent process controls the storing of received data packets in the skid buffer 402. This process begins in step 520, where the receiver controller 160 waits to receive a new data packet and corresponding valid signal. In step 522, the receiver controller 160 determines if a new data packet and valid signal are received. If a new data packet and valid signal are not received, then the second concurrent process returns to step 520. If, on the other hand, a new data packet and corresponding valid signal are received, then in step 524, the receiver controller 160 stores the data packet in the skid buffer location indicated by the write pointer 406 and advances the write pointer 406 to the next skid buffer location. The second concurrent process then returns to step 520.

The third concurrent process controls the reading of data packets from the skid buffer 402. This process begins in step 550, where the receiver controller 160 compares the read pointer 404 to the write pointer 406. If in step 552, the read pointer 404 and the write pointer 406 are pointing to the same skid buffer location, then there are no data packets that need to be read from the skid buffer 402, and the third concurrent process returns to step 550. If, however, the read pointer 404 and the write pointer 406 point to different skid buffer locations and the receiver controller 160 also determines that a hardware block or software process can accept the data packet, then a data packet is ready to be read from the skid buffer 402. In step 554, the receiver controller 160 reads out the data packet from the skid buffer location indicated by the read pointer 404 and advances the read pointer 404 to the next skid buffer location. The third concurrent process then returns to step 550.

Again, in this alternative embodiment, the processes of storing data packets in the skid buffer 402, reading those data packets from the skid buffer 402 and releasing and transmitting credits to the sending unit are decoupled from one another. A credit is released and transmitted only when the read pointer and the write pointer are pointing to different locations in the skid buffer, indicating that the skid buffer 402 has memory space available for one or more additional data packets. Since the sending unit transmits data only when it receives a credit from the receiving unit, there is no danger that the sending unit may transmit a data packet when memory space is not available in the skid buffer 402 for an additional data packet.

Figure 6:
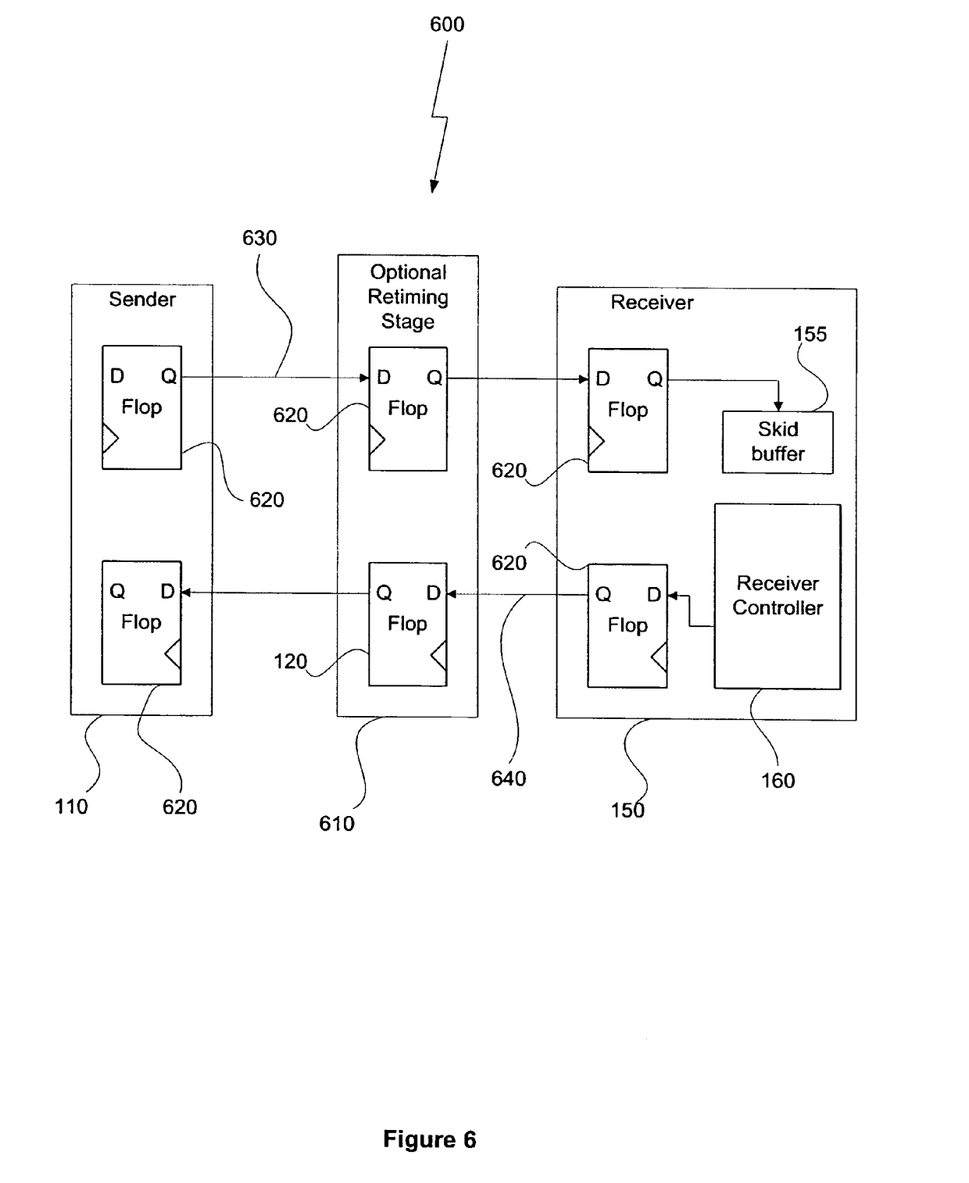
FIG. 6 is a conceptual diagram a long-distance synchronous bus, according to one embodiment of the invention.

FIG. 6 is a conceptual diagram of a long-distance synchronous bus 600, according to one embodiment of the invention. The long-distance synchronous bus 600 includes, without limitation, a sending unit 110, a receiving unit 150 and an optional retiming stage 610. Each of the sending unit 110, the receiving unit 150 and the optional retiming stage 610 may include one or more flops 620. The flop 620 typically is the last element a signal passes through as it leaves a logic block as well as the first element that a signal passes through as it enters a logic block. Those skilled in the art will recognize that flops 620 are simple logic elements used to register one or more signals with respect to a clock signal.

The optional retiming stage 610 may be implemented to increase the distance over which the signals (i.e., the data packets, valid signals and credits) between the sending unit 110 to the receiving unit 150 may be transmitted. For example, by including the optional retiming stage 610 in the signal path between the sending unit 110 and the receiving unit 150, the distance over which the signals between the sending unit 110 and the receiving unit 150 can be transmitted is increased by approximately the distance those signals propagate in one clock cycle, less flop propagation and setup time. Further, additional optional retiming stage 610 may be included in the signal path between the sending unit 110 and the receiving unit 150 to create an even longer-distance synchronous bus.

In addition to the foregoing, the optional retiming stage 610 does not include any additional logic because, unlike prior art retiming stages, the optional retiming stage 610 is not charged with detecting busy signals transmitted by the receiving unit 150. Since no additional logic is used in the optional retiming stage 610, the propagation delays associated with the optional retiming stage 610 are minimized, thereby enabling the distances between the sending unit 110 and the optional retiming stage 610, between any two optional timing stages 610, and between the optional retiming stage 610 and the receiving unit 150 to be increased. Consequently, fewer overall retiming stages may be needed in the long-distance synchronous bus 600 relative to prior art bus designs.

The simplicity of the optional retiming stage 610 allows a physical designer to insert the optional retiming stage 610 into a design at any time. Such flexibility is quite advantageous because timing information related to signal transmissions oftentimes is not available until the design has been placed and/or routed by the physical designer. Since the prior art retiming stages are far more complicated than the optional retiming stage 610, those retiming stages typically have to be included as part of the initial design. If timing information later indicates that a retiming stage is necessary, then a logic designer usually has to revisit the design, insert the required retiming stage and then the physical designer repeats the place and route cycle. Since the present invention allows a physical designer to add the optional retiming stages 610 on an as-needed basis, design time is reduced since the logic designer does not revisit the overall design.

In some embodiments, the number of flops 620 included in the round trip signal path may be used to determine the skid buffer size. Consider the long-distance synchronous bus 600 of FIG. 6 without the optional retiming stage 610. In such a case, only four flops are in the round trip signal path—two in the sending unit 110 and two in the receiving unit 150. If each flop in the credit signal path contains a credit, and simultaneously, each flop in the valid and data path contains a data packet and a corresponding valid signal, then the skid buffer 155 should be sized to receive the two data packets that are in route from the sending unit 110 as well as the two data packets that the sending unit 110 may transmit after receiving the two credits in route from the receiving unit 150. Thus, the skid buffer 155 should be sized to store four data packets. If the optional retiming stage 610 is used, then there are six flops in the round trip signal path and the skid buffer should be sized to store six data packets.

Figure 7:
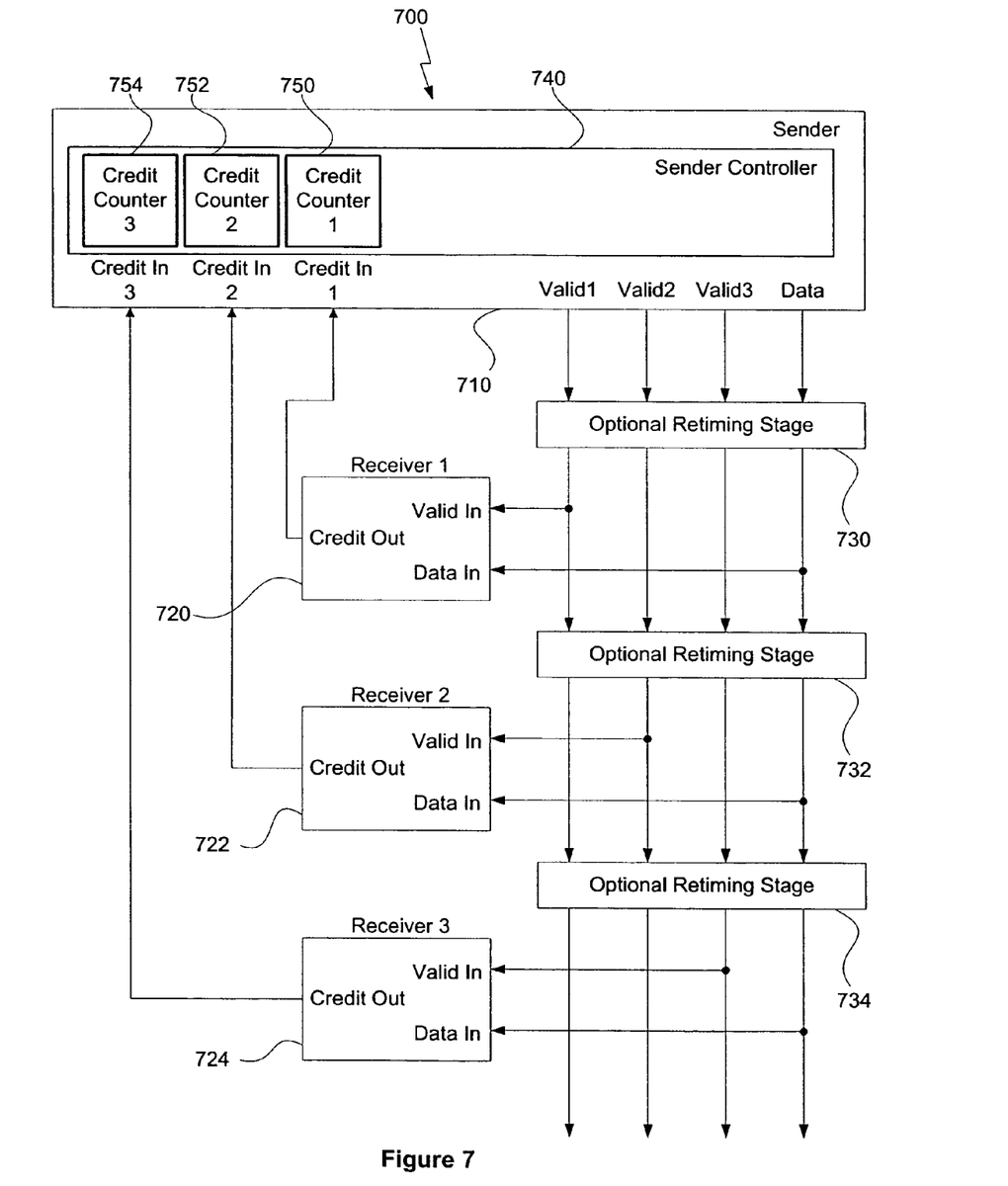
FIG. 7 is a conceptual diagram of a long-distance synchronous bus configured to transfer data to multiple receiving units, according to one embodiment of the invention.

FIG. 7 is a conceptual diagram of a long-distance synchronous bus 700 configured to transfer data to multiple receiving units, according to one embodiment of the invention. The long-distance synchronous bus 700 includes, without limitation, a sending unit 710, a first receiving unit 720, a second receiving unit 722, a third receiving unit 724, a first optional retiming stage 730, a second optional retiming stage 732, and a third optional retiming stage 734. Although only three receiving units are shown, alternative embodiments may include more or less than three receiving units. The sending unit 710, the first receiving unit 720, the second receiving unit 722 and the third receiving unit 724 are configured to transmit and receive data packets, valid signals and credits, as previously described herein. Specifically, the sending unit 710 is configured to transmit data packets and corresponding valid signals to the first receiving unit 720, the second receiving unit 722 and the third receiving unit 724, and the first receiving unit 720, the second receiving unit 722 and the third receiving unit 724 are configured to transmit credits to the sending unit 710. In one embodiment, the receiving units 720, 722, and 724 have dedicated channels for the valid signals and credits. Only the channels for the data packets are common to all of the units. Each receiving unit 720, 722, and 724 includes a skid buffer (not shown).

As also described previously herein, the optional retiming stages 730, 732 and 734 are used to increase the distance between the sending unit 710 and the receiving units 720, 722, and 724. In alternative embodiments, more or less than three optional retiming stages may be used. Unlike the optional retiming stage 610 of FIG. 6, the optional retiming stages 730, 732 and 734 do not process the credits transmitted by the receiving units 720, 722, and 724. In alternative embodiments, the optional retiming stages 730, 732 and 734 may include flops to process the credits, as required by system timing constraints.

The sending unit 710 includes a sender controller 740 that controls the transmission of data packets and valid signals to the receiving units 720, 722 and 724. The sender controller 740 includes a first credit counter 750, a second credit counter 752 and a third credit counter 754. Each of the credit counters is configured to track the inventory of credits associated with a given receiving unit. For example, the first credit counter 750 is configured to track the inventory of credits associated with the first receiving unit 720. In one embodiment, the first credit counter 750, the second credit counter 752 and the third credit counter 754 function substantially like the credit counter 135 of FIG. 1B.

In one embodiment, the first receiving unit 720, the second receiving unit 722 and the third receiving unit 724 are configured to function substantially like the receiving unit 150 of FIG. 1C. Therefore, after each receiving unit 720, 722 and 724 receives a first data packet and corresponding valid signal, each receiving unit 720, 722 and 724 releases a number of credits to the sending unit 710 corresponding to the size of its respective skid buffer. For example, after the first receiving unit 720 receives a first data packet and valid signal, the first receiving unit 720 releases N–1 credits to the sending unit 710 where N is the number of data packets that may be stored in the skid buffer associated with the first receiving unit 720.

As previously described herein, in order to send a data packet to one of the receiving units 720, 722 or 724, the sender controller 740 must have a credit associated with that particular receiving unit. For example, in order to send a data packet to the second receiving unit 722, the second credit counter 752 should indicate to the sender controller 740 that at least one unconsumed credit has been received from the second receiving unit 722. Likewise, if data is being sent to more than one receiving unit, then each of the credit counters corresponding to those receiving units must indicate to the sender controller 740 that at least one unconsumed credit is available for those receiving units.

In one embodiment, the number of flops in the round trip signal path of the data packets, valid signals and credits determines the size of the skid buffers associated with the receiving units 720, 722 and 724. Thus, the optional retiming stages 730, 732 and 734 affect the sizes of the skid buffers associated with the receiving units 720, 722 and 724. For example, assume that the optional retiming stage 730 includes a flop for the transmitted data packets and valid signals. Then, in the case of the first receiving unit 720, there would be five flops in the round trip signal path. There would be a first flop in the sending unit 710 as a data packet and corresponding valid signal leave the sending unit 710; there would be a second flop in the optional retiming stage 730; there would be a third flop in the receiving unit 720 to receive the data packet and valid signal; there would be a fourth flop in the receiving unit 720 as a credit is released and transmitted to the sending unit 710; and there would be a fifth flop as the sending unit 710 receives the credit signal. Therefore, the skid buffer associated with the first receiving unit 720 should support five data packets. Since the round trip signal path for the second receiving unit 722 and the third receiving unit 724 would differ from the round trip signal path of the first receiving unit 720, the sizes of the skid buffers associated with the second receiving unit 722 and the third receiving unit 724 would also differ from the size of the skid buffer associated with the first receiving unit 720.

One advantage of the system disclosed in FIG. 7 is that it reduces routing congestion. With the approach of the prior art, each receiving unit requires a dedicated channel with which to receive data from the sending unit. As the number of receiving units in the system increases, so does the number of required dedicated channels between the sending unit and the various receiving units. Increasing the number of dedicated channels in and out of the sending unit causes routing congestion. By contrast, the disclosed system reduces the routing congestion by using a common data packet channel that may be routed to each receiver in a daisy chain fashion, thereby reducing the number of dedicated channels in and out of the sending unit.

Figure 8:
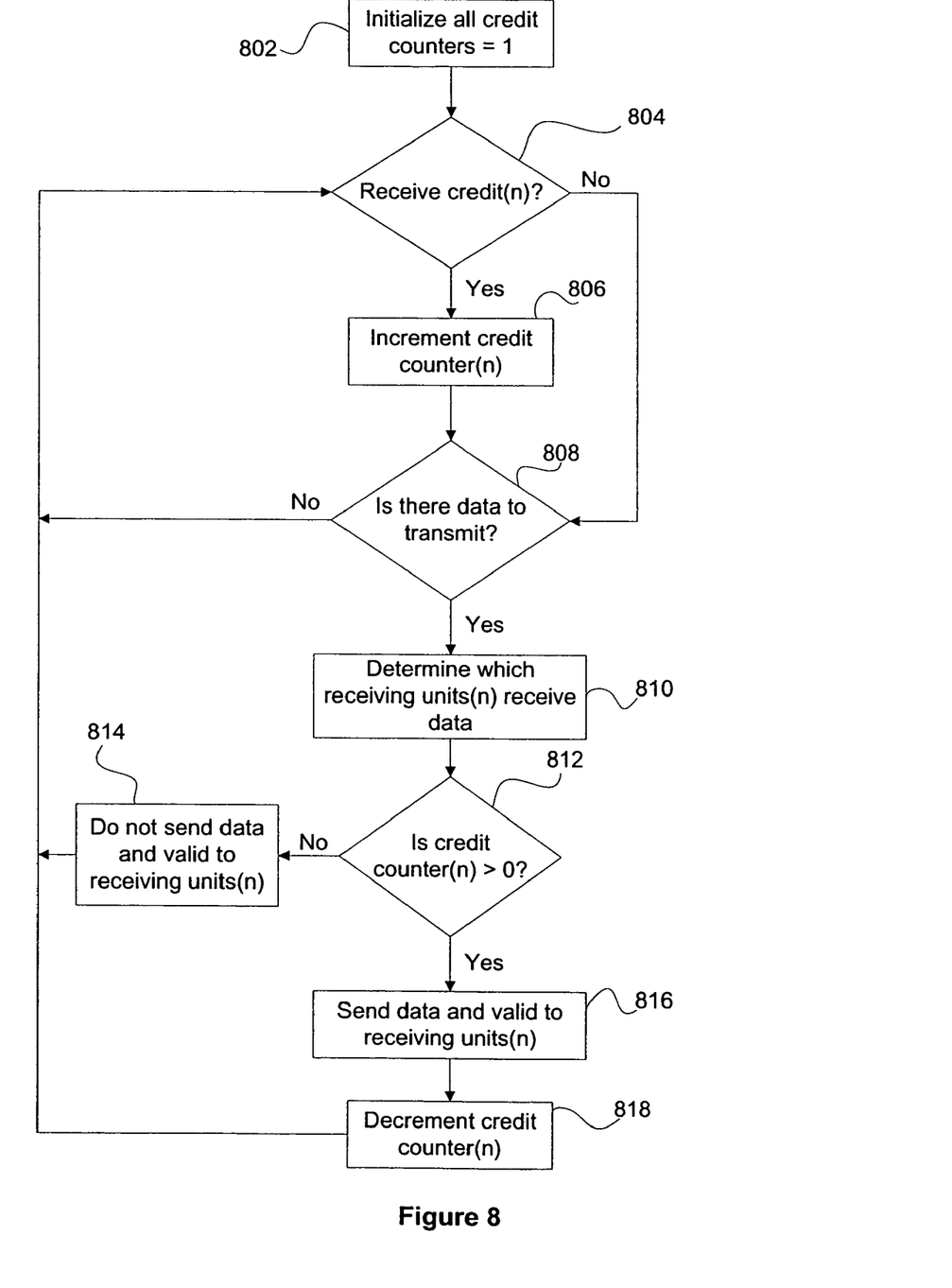
FIG. 8 is a flowchart of method steps for transmitting data to multiple receiving units, according to one embodiment of the invention.

FIG. 8 is a flowchart of method steps for transmitting data to multiple receiving units, according to one embodiment of the invention. Persons skilled in the art will recognize that any system configured to perform the method steps in any order is within the scope of the invention.

The method begins with step 802 where the credit counters 750, 752 and 754 in the sending unit 710 are initialized to one. Since the credit counters 750, 752 and 754 are set to one, the sending unit 710 is able to send one data packet to the receiving units 720, 722 and 724 when the data is available. In step 804, the sender controller 740 determines if any credits were received from any of the receiving units. This is denoted in FIG. 8 by "credit(n)" where n is the number of any receiving unit. If there are no credits received from any of the receiving units 720, 722 and 724, then the method proceeds to step 808. If, however, a credit was received from any of receiving units 720, 722 or 724, then in step 806, the credit counter associated with the receiving unit from which the credit was received is incremented. For example, if the sender controller 740 receives a credit from the receiving unit 720, then the first credit counter 750 is incremented. The credit counters 750, 752 and 754 track the inventory of credits associated with each of the receiving units 720, 722 and 724 available to the sender controller 740. The sender controller 740 is configured to act upon the credit counters 750, 752 and 754 separately and independently from one another; therefore, if credits are received from multiple receiving units, then each credit counter associated with a receiving unit from which a credit is received is incremented.

In step 808, the sender controller 740 determines if there is data available to transmit. If there is no data available to transmit, the method returns to step 804. Otherwise, if there is data available to transmit, then in step 810, the sender controller 740 selects the receiving units that are to receive the data. The data may be transmitted to one or more of the receiving units 720, 722 and 724. In step 812, the sender controller 740 determines if the credit counters corresponding to the selected receiving units are greater than zero. Again, the sender unit 710 only transmits data packets to receiving units that have memory space available in their respective skid buffers for additional data packets. Therefore, the sender unit 710 only transmits data packets to the receiving units whose associated credit counters are greater than zero.

If the credit counters corresponding to the selected receiving units are greater than zero, then in step 816, the data packet and corresponding valid signals are transmitted to the selected receiving units. As shown in FIG. 7, a valid signal is transmitted to a particular receiving unit only if the sender controller 740 determines that the receiving unit is to receive the transmitted data packet. Thus, if a particular receiving unit is not selected in step 810, then the sender controller 740 does not transmit a valid signal to that receiving unit and the receiving unit does not receive the transmitted data packet. If, on the other hand, the credit counters corresponding to the selected receiving units are not greater than zero, in step 814, the data packet and corresponding valid signals are not transmitted to the selected receiving units. The method then returns to step 804.

The sender controller 740 executes step 802 only once to initialize the credit counters in the sending unit 710. In operation, the sender controller 740 continuously loops through steps 804 through 818 to manage the receipt of credits and the transmission of data packets. Again, the method steps are structured such that the sending unit 710 does not transmit a data packet to a receiving unit unless the receiving unit has memory space available for an additional data packet. Thus, the skid buffers associated with the various receiving units do not overflow.

To illustrate broadcasting a data packet to the three receiving units 720, 722 and 724, assume that the method has initialized the credit counters 750, 752 and 754 (step 802). The sender controller 740 does not receive any additional credits, but does determine that there are data packets available to transmit (steps 804 and 808). Next, the sender controller 740 determines that the data packet is to be transmitted to all three receiving units 720, 722 and 724 and therefore checks to see whether the three credit counters 750, 752 and 754 are greater than zero (steps 810 and 812). Since the three credit counters 750, 752 and 754 are greater than zero (a credit was received from each of the receiving units upon initialization), the sender unit 710 transmits the data packet and the sender controller 740 asserts the three valid signals to the three receiving units 720, 722 and 724. The sender controller then decrements the credit counters 750, 752 and 754 (steps 816 and 818).

Transmitting data packets to fewer than three receiving units proceeds in a similar manner. For example, if a data packet is to be transmitted only to the first receiving unit 720 and the third receiving unit 724, the sender controller 740 will only determine if the first credit counter 750 and the third credit counter 754 are greater than zero (step 812). If true, then the sending unit 710 transmits the data packet and the sender controller 740 asserts only the first and third valid signals to the first receiving unit 720 and the third receiving unit 724 (step 816). The second valid signal is not asserted to the second receiving unit 722 and therefore the second receiving unit 722 does not receive the data packet.

While the foregoing is directed to embodiments of the present invention, other and further embodiments of the invention may be devised without departing from the basic scope thereof, and the scope thereof is determined by the claims that follow.

We claim:

1. A system for transmitting data over a bus, the system comprising:
    a sending unit that includes a sender controller; and
    a receiving unit that includes a receiver controller and a skid buffer configured to store data packets transmitted by the sending unit,
    wherein a read pointer points to a first location in the skid buffer, a write pointer points to a second location in the skid buffer, and a credit pointer points to a third location in the skid buffer, and
    wherein the sender controller is configured to receive a credit transmitted by the receiver controller when the first location is not the same as the third location and, in response to receiving the credit, the sending unit is configured to transmit a data packet to the receiving unit.

2. The system of claim 1, the receiver controller is configured to transmit the credit only when the skid buffer has memory space available for an additional data packet.

3. The system of claim 2, wherein the receiver controller includes a release credit counter configured to track credits available to transmit to the sending unit.

4. The system of claim 3, wherein the receiver controller is configured to increment the release credit counter when a data packet is read out of the skid buffer and to decrement the release credit counter when a credit is transmitted to the sending unit.

5. The system of claim 1, wherein a data packet is read out of the skid buffer if the first location is not the same as the second location and a hardware block or a software process is ready to accept the data packet.

6. The system of claim 1, wherein the receiver controller is configured to advance the read pointer when a data packet is read out of the skid buffer, to advance the write pointer when a data packet is received from the sending unit and stored in the skid buffer, and to advance the credit pointer when a credit is transmitted to the sending unit.

7. The system of claim 1, wherein the sending controller includes a credit counter configured to track an inventory of credits received from the receiving unit.

8. The system of claim 7, wherein the sender controller is configured to increment the credit counter when a credit is received from the receiving unit and to decrement the credit counter when a data packet is transmitted to the receiving unit.

9. The system of claim 7, wherein the credit counter is initialized to include one credit, and, in response to the one credit, the sending unit transmits one data packet to the receiving unit when data is available for transmission.

10. The system of claim 1, further comprising a retiming stage disposed in a signal path between the sending unit and the receiving unit such that the retiming stage receives the data packet from the sending unit and transmits the data packet to the receiving unit and receives the credit from the receiving unit and transmits the credit to the sending unit.

11. The system of claim 10, wherein the retiming stage includes a first flop for receiving and transmitting the data packet and a second flop for receiving and transmitting the credit.

12. A system for transmitting data over a bus, the system comprising:
    a sending unit that includes a sender controller;
    a first receiving unit that includes a first receiver controller and a first skid buffer configured to store data packets transmitted by the sending unit; and a second receiving unit that includes a second receiver controller and a second skid buffer configured to store data packets transmitted by the sending unit, wherein a first read pointer points to a first location in the first skid buffer, a first write pointer points to a second location in the first skid buffer, a first credit pointer points to a third location in the first skid buffer, a second read pointer points to a fourth location in the second skid buffer, a second write pointer points to a fifth location in the second skid buffer, and a second credit pointer points to a sixth location in the second skid buffer, and wherein the sender controller is configured to receive credits transmitted by either of the first receiver controller and the second receiver controller when the first location is not the same as the third location or when the fourth location is not the same as the sixth location and, in response to receiving the credits, the sending unit is configured to transmit data packets to either of the first receiving unit and the second receiving unit.

13. The system of claim 12, wherein the sender controller includes a first credit counter associated with the first receiving unit and a second credit counter associated with the second receiving unit.

14. The system of claim 13, wherein each of the first credit counter and the second credit counter is initialized to include one credit, and, in response to the credits, the sending unit transmits one data packet to each of the first the receiving unit and the second receiving unit when data is available for transmission.

15. The system of claim 13, wherein the sender controller is configured to increment the first credit counter when a credit is received from the first receiving unit, to decrement the first credit counter when a data packet is transmitted to the first receiving unit, to increment the second credit counter when a credit is received from the second receiving unit, and to decrement the second credit counter when a data packet is transmitted to the second receiving unit.

16. The system of claim 15, wherein if the sender controller determines that the first receiving unit is to receive data and that the first credit counter has a value greater than zero, the sender controller is configured to transmit a first valid signal to the first receiving unit and to have the sending unit transmit a data packet to the first receiving unit.

17. The system of claim 16, wherein if the sender also determines that the second receiving unit also is to receive data and that the second credit counter has a value greater than zero, the sender controller is configured to transmit a second valid signal to the second receiving unit and to have the sending unit transmit the data packet to the second receiving unit as well.

18. The system of claim 12, further comprising a first retiming stage disposed in a signal path between the sending unit and the first receiving unit and a second retiming stage disposed in a signal path between the first receiving unit and the second receiving unit.

19. The system of claim 18, wherein the first retiming state includes a first flop for receiving and transmitting a first valid signal, a second flop for receiving and transmitting a second valid signal, and a third flop for receiving and transmitting a data packet.

20. The system of claim 19, wherein the second timing stage includes a first flop for receiving and transmitting the second valid signal and a second flop for receiving and transmitting the data packet.

* * * * *